May 1, 1928.
G. R. FALKINER-NUTTALL
1,668,197
SUSPENSION TOWER
Filed June 2, 1926
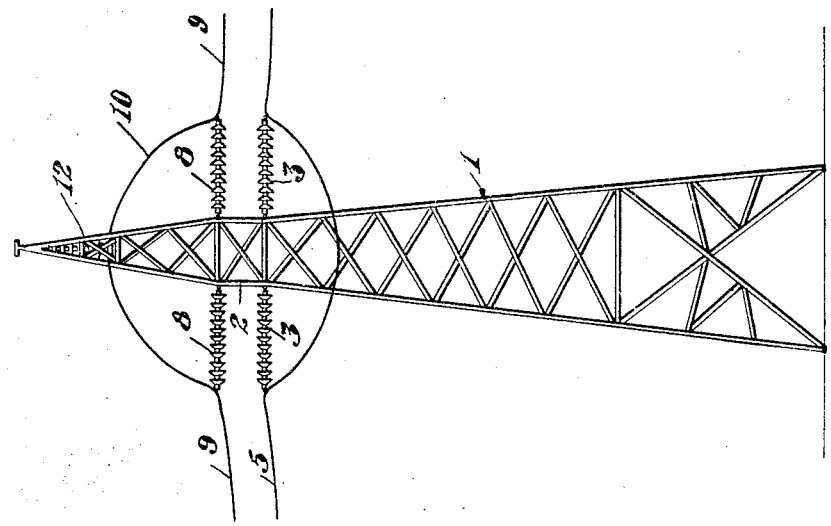
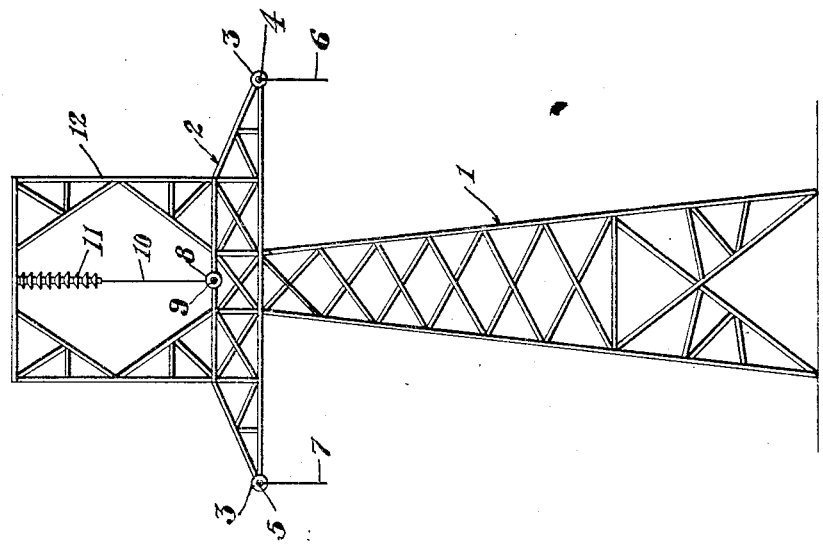
INVENTOR.
George R. Falkiner-Nuttall
BY Townsend Loftus & Abbett
ATTORNEYS.

Patented May 1, 1928.

1,668,197

UNITED STATES PATENT OFFICE.

GEORGE R. FALKINER-NUTTALL, OF SAN FRANCISCO, CALIFORNIA.

SUSPENSION TOWER.

Application filed June 2, 1926. Serial No. 113,124.

This invention relates to suspension towers for carrying high power electric cables. The towers heretofore used for this purpose have been subject to objections of various kinds, among these objections may be mentioned the following: The cables have been supported too close to the towers or so supported that they might swing or in some manner come into contact or close proximity with the towers and thereby cause a short circuit or leak in the circuit. In case of breakage of a cable, or of its supporting means, the cable might swing toward or into contact with a tower, and the connection of the cables to the towers has been such that upon breakage of one cable the remaining cables place a damaging torsional stress upon the towers, or do not transmit these stresses equally among the legs and footings of the tower. It is one object of my invention to provide a tower having improved features which overcome these objections.

The present invention contemplates the construction of a tower having a pyramid-shaped cage-type steel frame supporting a latticed cross-arm and a super-posed top cage. Said cross-arm and top cage carrying insulator strings adapted to support the weight of line cables and jumpers adequately, and by a structure having maximum strength and minimum dimensions whereby the cables will be rigidly supported and the jump wires will be suitably held to insure against arcing.

In the accompanying drawings I have illustrated certain specific embodiments of my invention, but it will be understood that the invention can be otherwise embodied and that the drawings are not to be construed as defining or limiting the scope of the invention, the claims appended to the specification being relied upon for that purpose.

Figure 1 is a view in front elevation showing the tower structure with which the present invention is concerned, and particularly disclosing the cable arrangement.

Fig. 2 is a view in side elevation showing the tower disclosed in Fig. 1 and more particularly disclosing the insulator strings and the jump wire arrangement.

In the drawings 1 indicates the pyramid base of the tower with which the present invention is concerned. This base is formed of structural steel and is of the square-cage type. The upper end of this base carries a cross-arm structure, 2. This member extends horizontally and is of lattice box girder construction, terminating at its outer overhanging ends in supports for insulator strings, 3. These strings in turn support cables 4 and 5 respectively, as well as jumpers 6 and 7. Midway the length of the cross-arm structure, 2, is disposed a pair of insulator strings, 8, which support the central cable, 9, and an overhead jumper, 10. The overhead jumper is supported at a point midway its length by a vertically disposed insulator string, 11. This structure is supported from a cage, 12, carried by the transversely extending cross-arm, 2. This cage is suitably constructed from structural steel and is so designed as to be adequately braced against any strains which may be imposed upon it. By this arrangement it has been possible to provide the tower with an economical and standard form of supporting base, which has proven to have exceptional strength, and to be easily adapted to the topography of the land over which the feed wires are carried, and upon which base a superstructure is disposed which will carry the load imposed by the feed wires, and will at the same time afford adequate insulation for the wires so that they are not liable to arc with relation to each other or with relation to the tower structure.

It will thus be seen that the construction here provided, standardizes power line suspension towers and makes it possible to utilize one tower structure in connection with most power line installations.

While I have shown the preferred form of my invention, as now known to me, it will be understood that various changes may be made in the combination and construction and arrangement of parts by those skilled in the art without departing from the spirit of the invention as claimed.

Having thus described my invention, what I claim is:

1. A suspension tower for high power electric cables, comprising a pyramid cage-type steel frame tower, a transversely disposed cable supporting structure mounted upon the upper end of said tower, three pairs of insulator strings connecting to the opposite sides of the two ends and the center, respectively, of said transversely disposed supporting section, and to the outer ends of which cables are secured, a superstructure mounted upon and disposed centrally of the cable supporting structure, an insulator string dependent therefrom, and a jumper connecting the ends of the cables secured to the central insulator strings and which jumper extends upwardly and is supported intermediate its ends by the dependent insulator string.

2. A suspension tower for high power electric cables, comprising a steel frame tower of relatively small horizontal section, a latticed cable supporting member extending transversely of and overhanging the upper end of said tower for supporting and horizontally spacing high tension cables, pairs of insulator strings secured to the outer ends of said transverse support, and near the lower edge thereof, a pair of insulator strings secured to the opposite sides of the center of the transverse support and disposed adajacent the upper edge thereof, a superposed frame disposed centrally of and carried upon the transverse cable support, a cable string dependent from the center of said superposed frame, cables secured to the outer ends of each of the insulator strings carried by the transverse cable supporting frame, and a jumper secured to the cables which are attached to the pair of centrally disposed insulator strings, said jumper extending upwardly to be engaged and supported by the dependent insulator string.

3. A cable tower for high power electric cables, comprising a pyramid-shaped, cage-type steel frame tower, a latticed steel frame extending horizontally and transversely of the upper end of said pyramid tower, said frame overhanging the sides of the tower in a manner to give adequate horizontal operation for the cables to be supported thereby, pairs of insulator strings secured to the ends of said transverse frame and near the lower edge thereof, and to the outer ends of which strings cables are secured, a pair of insulator strings secured centrally of the transverse cable supporting frame and disposed adjacent the upper edge thereof, a cable secured to the outer ends of said insulator strings, a steel superframe disposed centrally of and carried by the transverse cable supporting frame, an insulator string dependent centrally from the superframe, and a jumper supported above the transverse cable supporting frame by said dependent insulator string and secured by its opposite ends to the cable which is attached to the outer ends of the central insulator strings.

GEORGE R. FALKINER-NUTTALL.